United States Patent
Min et al.

(10) Patent No.: US 12,169,542 B2
(45) Date of Patent: Dec. 17, 2024

(54) FINGERPRINT AUTHENTICATION METHOD AND FINGERPRINT AUTHENTICATION DEVICE

(71) Applicant: Samsung Electronics Co., Ltd., Suwon-si (KR)

(72) Inventors: Ying Min, Shaanxi (CN); Huaiwen Bai, Shaanxi (CN); Yanjun Chen, Shaanxi (CN); Xiaochun Yan, Shaanxi (CN); Wenyan Zheng, Shaanxi (CN)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 362 days.

(21) Appl. No.: 17/591,214

(22) Filed: Feb. 2, 2022

(65) Prior Publication Data
US 2022/0253515 A1 Aug. 11, 2022

(30) Foreign Application Priority Data
Feb. 5, 2021 (CN) .......................... 202110162952.3

(51) Int. Cl.
G06F 21/00 (2013.01)
G06F 21/32 (2013.01)
G06V 40/12 (2022.01)

(52) U.S. Cl.
CPC .......... *G06F 21/32* (2013.01); *G06V 40/1371* (2022.01); *G06V 40/1376* (2022.01)

(58) Field of Classification Search
CPC ................ G06F 21/32; G06V 40/1371; G06V 40/1376; G06V 40/1347; G06V 40/13; G06V 40/1365
See application file for complete search history.

(56) References Cited

U.S. PATENT DOCUMENTS

| | | | |
|---|---|---|---|
| 2004/0128521 A1 | 7/2004 | Russo | |
| 2020/0218879 A1* | 7/2020 | Hara | G06V 40/1359 |
| 2021/0056283 A1* | 2/2021 | Yankov | G06F 21/32 |
| 2021/0165987 A1* | 6/2021 | Kim | G06V 40/50 |
| 2021/0319204 A1* | 10/2021 | Zheng | G06V 10/757 |
| 2022/0335750 A1* | 10/2022 | Vibert | G06V 40/1371 |
| 2023/0045850 A1* | 2/2023 | Sammoura | G06V 10/751 |

FOREIGN PATENT DOCUMENTS

CN 100447806 C 12/2008

* cited by examiner

*Primary Examiner* — Ka Shan Choy
(74) *Attorney, Agent, or Firm* — Harness, Dickey & Pierce, P.L.C.

(57) ABSTRACT

Various example embodiments are directed to a fingerprint authentication method and a fingerprint authentication device. The fingerprint authentication method includes acquiring target fingerprint data of a user using at least one fingerprint sensor, determining a preliminary authentication result of the target fingerprint data based on at least one historical fingerprint data stored in memory, performing a matching check on the preliminary authentication result, and determining a final authentication result of the target fingerprint data based on results of the matching check.

20 Claims, 9 Drawing Sheets
(2 of 9 Drawing Sheet(s) Filed in Color)

FINGERPRINT AUTHENTICATION METHOD AND FINGERPRINT AUTHENTICATION DEVICE

CROSS-REFERENCE TO RELATED APPLICATION

This U.S. non-provisional application claims the benefit of priority under 35 USC § 119 to Chinese Patent Application No. 202110162952.3, filed on Feb. 5, 2021, in the China National Intellectual Property Administration (CNIPA), the disclosure of which is incorporated by reference herein in its entirety.

BACKGROUND

Various example embodiments of the inventive concepts relate to fingerprint authentication, and more specifically, to fingerprint authentication methods and/or fingerprint authentication devices.

In related technologies, most fingerprint authentication algorithms are based on fingerprint minutia matching because algorithms based on fingerprint minutia matching have low complexity, small memory requirements and low latency, which are suitable for embedded devices, such as smart cards, fingerprint door locks, etc. However, the current fingerprint authentication algorithms based on fingerprint minutia matching have low authentication accuracy, which may cause the fingerprint authentication algorithms to incorrectly fail to recognize a users' fingerprints smoothly, and thereby negatively affect the users' operating experience, or may cause non-users to successfully gain access to user devices based on false-positive fingerprint recognition, which may cause security risks.

SUMMARY

Various example embodiments of the inventive concepts provide fingerprint authentication methods and/or corresponding fingerprint authentication devices.

According to one aspect of at least one example embodiment of the inventive concepts, a fingerprint authentication method is provided. The fingerprint authentication method may include acquiring target fingerprint data of a user using at least one fingerprint sensor, determining a preliminary authentication result of the target fingerprint data based on at least one historical fingerprint data stored in memory, performing a matching check on the preliminary authentication result, and determining a final authentication result of the target fingerprint data based on results of the matching check.

The accuracy of fingerprint authentication may be significantly improved by performing the matching check on the preliminary authentication result and determining the final authentication result of the target fingerprint based on a result of the matching check.

Additionally, the determining the preliminary authentication result may include determining at least one minutia matching pair included in the target fingerprint data, the determining the at least one minutia matching pair including, extracting a real-time minutia from the target fingerprint data, and extracting a historical minutia from the at least one historical fingerprint data matching the real-time minutia, and determining a preliminary matching score corresponding to the at least one minutia matching pair.

Quantifying the preliminary authentication result based on the result of the matching check through setting the preliminary matching score, to determine the final authentication result, wherein the real-time minutia and the matched historical minutia provide the basis for subsequent check, may further improve and/or make more convenient the processing of the fingerprint authentication method.

Additionally, the performing the matching check on the preliminary authentication result may further include performing the matching check on the at least one minutia matching pair of the target fingerprint data based on a data template.

Additionally, the data template may include the data template comprises historical minutiae, and historical minutia surrounding features associated with the historical minutiae, and the performing the matching check on the at least one minutia matching pair of the target fingerprint data based on the data template comprises, determining at least one real-time minutia surrounding feature from the target fingerprint data, and performing the matching check on the at least one minutia matching pair of the target fingerprint data based on the real-time minutia surrounding feature of the target fingerprint data and a historical minutia surrounding feature of the at least one historical fingerprint data.

The data template may store the historical minutiae and the historical minutia surrounding features associated with the historical minutiae, which may be used for subsequent check based on real-time minutia surrounding features and corresponding historical minutia surrounding features. That is, it provides data support for the operation of performing the check based on the "real-time minutia surrounding features".

Additionally, the real-time minutia surrounding feature may include a plurality of real-time ridge points of a ridge where the real-time minutia is located in the target fingerprint data; the historical minutia surrounding feature may include a plurality of historical ridge points of a ridge where the historical minutia is located in the at least one historical fingerprint data, and the performing the matching check on the at least one minutia matching pair of the target fingerprint data based on the real-time minutia surrounding feature and the historical minutia surrounding feature comprises, determining at least one ridge point matching pair from the plurality of real-time ridge points and the plurality of historical ridge points by identifying a real-time ridge point and a historical ridge point pair whose coordinate error is less than a coordinate error threshold value and/or whose direction angle error is less than a direction angle error threshold value, and determining the results of the matching check based on a ratio of a number of real-time ridge points involved in the determined ridge point matching pair to a number of the plurality of real-time ridge points.

Additionally, the determining the at least one ridge point matching pair may include determining a rotation and translation factor based on the real-time minutia and the historical minutia, and performing coordinate translation and/or direction angle rotation on the plurality of historical ridge points by using the rotation and translation factor.

In at least one example embodiment, the matching check based on "ridge points" is performed, "the ratio of the number of real-time ridge points involved in the determined ridge point matching pair to the number of the plurality of real-time ridge points" is taken as a quantitative basis, which may facilitate the subsequent adjustment of the preliminary matching score, and then correct the misrecognition in the preliminary authentication result, and thereby improve the accuracy of the final authentication result.

Additionally, the real-time minutia surrounding feature may include a plurality of real-time ridges between the real-time minutia and each neighbor real-time minutia, and the historical minutia surrounding feature may include a plurality of historical ridges between the historical minutia and each neighbor historical minutia, and performing the matching check on the at least one minutia matching pair of the target fingerprint data based on the real-time minutia surrounding feature and the historical minutia surrounding feature of the target fingerprint data comprises, determining a matching relationship between a plurality of real-time minutiae and a plurality of historical minutiae based on the at least one minutia matching pair of the target fingerprint data, determining, based on the matching relationship, a plurality of real-time minutia pairs and a plurality of corresponding historical minutia pairs, calculating a number of real-time ridges between each of the plurality of real-time minutia pairs and a number of historical ridges between each of the plurality of historical detail pairs, respectively, determining a number of real-time minutia pairs whose difference between the number of real-time ridges and the number of corresponding historical ridges is less than a quantitative ratio threshold value, and determining the result of the matching check based on a ratio between the determined number of real-time minutia pairs and a total number of real-time minutia pairs.

In at least one example embodiment, the matching check based on "the number of ridges" is performed, "the ratio of the number of real-time minutia pairs where the difference between the number of real-time ridges and the number of corresponding historical ridges is less than the third threshold to the number of the plurality of real-time minutia pairs" is taken as a quantitative basis, which may facilitate the subsequent adjustment of the preliminary matching score, and then correct the misrecognition in the preliminary authentication result, and thereby improve the accuracy of the final authentication result.

Additionally, the performing the matching check on the at least one minutia matching pair of the target fingerprint data based on the data template may include: acquiring real-time location information corresponding to the real-time minutia included in each of the at least one minutia matching pair, acquiring historical location information corresponding to the historical minutia included in each of the at least one minutia matching pair from the data template, determining a first public area corresponding to each of the real-time minutia based on the corresponding real-time location information, determining a second public area corresponding to each of the historical minutia based on the corresponding historical location information, calculating a first number of real-time minutiae in each of the first public areas, calculating a second number of historical minutiae in each of the second public areas, calculating, based on a matching relationship of the minutia matching pair, a number of real-time minutiae whose difference between the first number and the second number is less than a difference threshold value, and determining the result of the matching check based on a ratio between the calculated number of real-time minutiae and a total number of real-time minutiae in the at least one minutia matching pair.

In at least one example embodiment, the matching check based on "real-time minutiae" is performed, "the ratio of the number of real-time minutiae whose the difference between the first number and the second number is less than the fourth threshold to the number of real-time minutiae in the at least one minutia matching pair" is taken as a quantitative basis, which may facilitate the subsequent adjustment of the preliminary matching score, and then correct the misrecognition in the preliminary authentication result, and may improve the accuracy of the final authentication result.

Additionally, the determining the final authentication result of the target fingerprint data based on the result of the matching check may include: adjusting the preliminary matching score based on the result of the matching check; determining the target fingerprint data is authenticated in response to the adjusted preliminary matching score being greater than a desired matching score threshold; and determining the target fingerprint data fails authentication in response to the adjusted preliminary matching score is less than or equal to the desired matching score threshold.

According to at least on example embodiment, through adjusting the preliminary matching score based on the result of the matching check, the accurate quantitative check may be performed on each minutia matching pair in the preliminary authentication result, which corrects the misrecognition in the preliminary recognition result, and realizes the improvement of the accuracy of the final authentication result.

According to another aspect of at least one example embodiment of the inventive concepts, a fingerprint authentication device is provided, the fingerprint authentication device may include: memory having computer readable instructions stored thereon, and processing circuitry configured to execute the computer readable instructions to, acquire target fingerprint data of a user using at least one fingerprint sensor, determine a preliminary authentication result of the target fingerprint data based on at least one historical fingerprint data stored in the memory, perform a matching check on the preliminary authentication result, and determine a final authentication result of the target fingerprint data based on a result of the matching check.

Additionally, the processing circuitry may be configured to determine whether at least one minutia matching pair included in the target fingerprint data, the determining the at least one minutia matching pair including, extracting a real-time minutia from the target fingerprint data, and extracting a historical minutia from the at least one historical fingerprint data matching the real-time minutia, and determine a preliminary matching score corresponding to the at least one minutia matching pair.

Additionally, the processing circuitry may be further configured to perform the matching check on the at least one minutia matching pair of the target fingerprint data based on a data template.

Additionally, the data template includes historical minutiae, and historical minutia surrounding features associated with the historical minutiae, and the processing circuitry is further configured to determine at least one real-time minutia surrounding feature from the target fingerprint data; and perform the matching check on the at least one minutia matching pair of the target fingerprint data based on the real-time minutia surrounding feature of the target fingerprint data and a historical minutia surrounding feature of the at least one historical fingerprint data.

Additionally, the real-time minutia surrounding feature comprises a plurality of real-time ridge points of a ridge where the real-time minutia is located in the target fingerprint data; the historical minutia surrounding feature comprises a plurality of historical ridge points of a ridge where the historical minutia is located in the at least one historical fingerprint data, and the processing circuitry is further configured to, determine at least one ridge point matching pair from the plurality of real-time ridge points and the plurality of historical ridge points by identifying a real-time ridge point and a historical ridge point pair whose coordinate error is less than a coordinate error threshold value and/or whose direction angle error is less than a direction angle error threshold value, and determine the results of the matching check based on a ratio of a number of real-time ridge points involved in the determined ridge point matching pair to a number of the plurality of real-time ridge points.

Additionally, the processing circuitry is further configured to: determine a rotation and translation factor based on the real-time minutia and the historical minutia, and perform coordinate translation and/or direction angle rotation on the plurality of historical ridge points by using the rotation and translation factor.

Additionally, the real-time minutia surrounding feature comprises a plurality of real-time ridges between the real-time minutia and each neighbor real-time minutia, and the historical minutia surrounding feature comprises a plurality of historical ridges between the historical minutia and each neighbor historical minutia, and the processing circuitry is further configured to, determine a matching relationship between a plurality of real-time minutiae and a plurality of historical minutiae based on the at least one minutia matching pair of the target fingerprint data, determine, based on the matching relationship, a plurality of real-time minutia pairs and a plurality of corresponding historical minutia pairs, calculate a number of real-time ridges between each of the plurality of real-time minutia pairs and a number of historical ridges between each of the plurality of historical detail pairs, respectively, determine a number of real-time minutia pairs whose difference between the number of real-time ridges and the number of corresponding historical ridges is less than a quantitative ratio threshold value, and determine the result of the matching check based on a ratio between the determined number of real-time minutia pairs and a total number of real-time minutia pairs.

Additionally, the processing circuitry is further configured to acquire real-time location information corresponding to the real-time minutia included in each of the at least one minutia matching pair, acquire historical location information corresponding to the historical minutia included in each of the at least one minutia matching pair from the data template, determine a first public area corresponding to each of the real-time minutia based on the corresponding real-time location information, determine a second public area corresponding to each of the historical minutia based on the corresponding historical location information, calculate a first number of real-time minutiae in each of the first public areas, calculate a second number of historical minutiae in each of the second public areas, calculate, based on a matching relationship of the minutia matching pair, a number of real-time minutiae whose difference between the first number and the second number is less than a difference threshold value, and determine the result of the matching check based on a ratio between the calculated number of real-time minutiae and a total number of real-time minutiae in the at least one minutia matching pair.

Additionally, the processing circuitry is further configured to: adjust the preliminary matching score based on the result of the matching check; determine the target fingerprint data is authenticated in response to the adjusted preliminary matching score being greater than a desired matching score threshold; and determine the target fingerprint data fails authentication in response to the adjusted preliminary matching score being less than or equal to the desired matching score threshold.

According to another aspect of at least one example embodiment of the inventive concepts, a non-transitory computer-readable storage medium storing computer readable instructions is provided, wherein the computer readable instructions, when executed by at least one processor, causes the at least one processor to implement the fingerprint authentication method as described above.

According to another aspect of at least one example embodiment of the inventive concepts, an electronic device including at least one processor and at least one memory storing computer-executable instructions is provided, wherein the computer-executable instructions, when executed by the at least one processor, causes the at least one processor to execute the fingerprint authentication method as described above.

In summary, the fingerprint authentication method provided by one or more example embodiments of the inventive concepts may perform the matching check on the minutia matching pair involved in the preliminary authentication result by acquiring the minutia surrounding feature, and adaptively adjust the matching score based on the result of the check, thereby improving the accuracy of minutia matching, reducing the probability of mis-authentication of fingerprint authentication, and/or ensuring the security of user equipment information while improving user experience.

In addition, the matching check algorithms proposed by at least one example embodiment of the inventive concepts are all lightweight, which will not increase the complexity of the minutia fingerprint matching algorithm, and may be applied to lightweight embedded devices such as smart cards.

Additional aspects and/or advantages of the example embodiments of the inventive concepts will be partially and/or fully described in the following description, and other aspects and/or advantages will be clear through the description or may be learned through the implementation of the example embodiments of the inventive concepts.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Through the following description in conjunction with the accompanying drawings showing various example embodiments, the above and other objectives and features of the example embodiments of the inventive concepts will become clearer, in which.

DETAILED DESCRIPTION

Figure 1A:
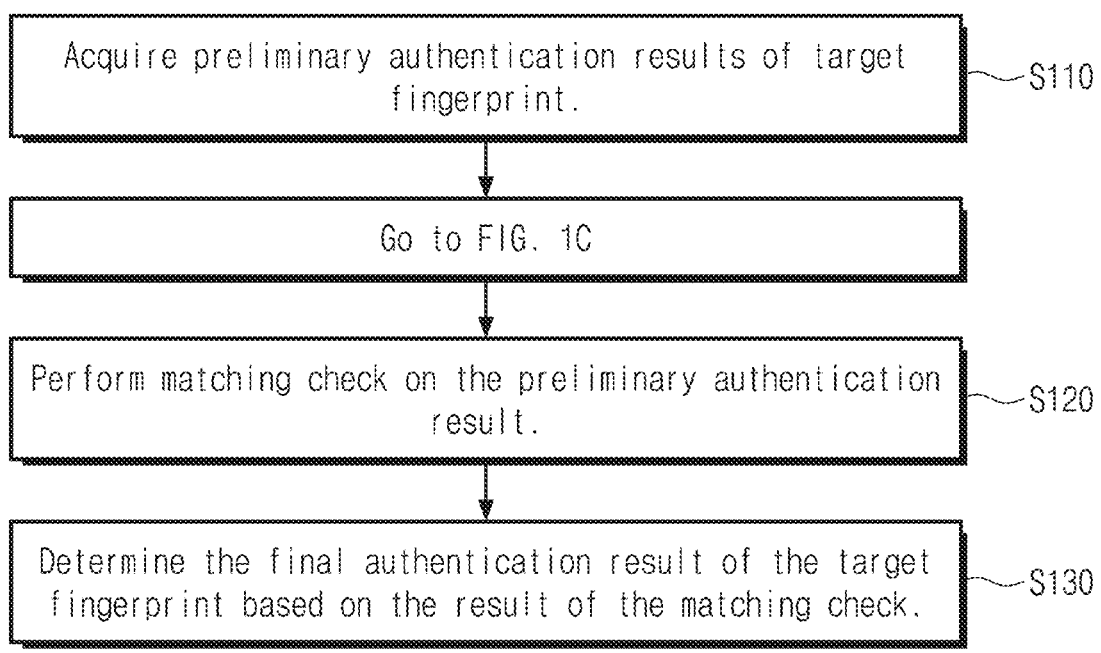
FIGS. 1A to 1G are flowcharts showing fingerprint authentication methods according to some example embodiments of the inventive concepts.

The following specific implementations are provided to help readers gain a comprehensive understanding of the methods, devices and/or systems described herein. However, a person of ordinary skill in the art will immediately understand that various changes, modifications and equivalents of the methods, devices, and/or systems described herein may be made. For example, the order of operations described herein is only an example, and is not limited to those set forth herein, and may be changed as will be clear after understanding the disclosed example embodiments, except for operations that must occur in a specific order. In addition, for more clarity and conciseness, descriptions of features known in the art may be omitted.

The features described herein may be implemented in different forms and should not be construed as being limited to the examples described herein. On the contrary, the examples described herein have been provided to illustrate only some of many possible ways of implementing the methods, devices, and/or systems described herein, the many possible ways will be clear after understanding the example embodiments of the inventive concepts.

The terms used herein are only used to describe various examples and will not be used to limit the example embodiments. Unless the context clearly dictates otherwise, the singular form is also intended to include the plural form. The terms "comprising", "including" and "having" indicate that the stated features, quantities, operations, components, elements and/or combinations thereof exist, but do not exclude the presence or addition of one or more other features, quantities, operations, components, elements and/or combinations thereof.

Unless defined otherwise, all terms (including technical terms and scientific terms) used herein have the same meanings as commonly understood by those of ordinary skill in the art to which the example embodiments of the inventive concepts belong. Unless explicitly defined as such herein, terms (such as those defined in general dictionaries) should be interpreted as having meanings consistent with their meanings in the context of the relevant field and in the example embodiments of the inventive concepts, and should not be idealized or explained too formally.

In addition, in the description of one or more of the example embodiments, when it is considered that detailed description of a well-known related structure or function will cause a vague interpretation of the example embodiments of the inventive concepts, such detailed description will be omitted.

Hereinafter, the example embodiments will be described in detail with reference to the drawings. However, the example embodiments may be implemented in various forms, and are not limited to the examples described herein.

In order to solve the technical problems mentioned in the above background art, the inventors of the inventive concepts have conducted repeated studies on related technologies and discovered the reasons for the above technical problems, which are specifically as follows:

Currently, an area of a fingerprint acquisition sensor (e.g., a fingerprint sensor) of a fingerprint authentication device is relatively small, the fingerprint acquisition sensor may only acquire a part of a fingerprint, and therefore a number of minutiae on the part of the acquired fingerprint is relatively small. The term "minutia" refers to an end point and/or a bifurcation point of a fingerprint ridge, etc. Consequently, the overlap area between the fingerprint acquired in real time and a stored historical fingerprint for comparison may be relatively small every time a fingerprint authentication is performed. Therefore, the number of minutiae that may be matched may be small, which leads to a low accuracy of the fingerprint authentication.

Based on the above reasons, at least one example embodiments provide improved accuracy of preliminary authentication results by using results of fingerprint minutia matching at this stage as a preliminary authentication result, and then checking the preliminary authentication result.

Wherein, the preliminary authentication result may include a minutia matching pair during the preliminary matching, and the minutia matching pair includes a real-time minutia and a historical minutia for comparison (or in other words, a minutia matching pair or minutia matched pair, refers to a real-time minutia and a corresponding historical minutia which "matches" the real-time minutia, etc.). However, to improve the "check," of the minutia and thereby increase the accuracy of the fingerprint authentication, a minutia surrounding feature associated with the minutia matching pair may be used to verify the preliminary matching. Herein, the minutia surrounding feature may include one or more ridge points of a ridge where the minutia is located, the number of ridges between the minutia and neighbor minutiae (e.g., neighboring minutiae, etc.), the number of the neighbor minutiae, and the like. According to at least one example embodiment, a neighbor minutiae may be a minutiae proximate to the real-time minutiae (e.g., a target and/or desired minutiae, etc.), for example, the neighbor minutiae may be within a desired distance threshold, etc., of the real-time minutiae, but the example embodiments are not limited thereto. The specific process of the "check" may include, for example, comparing coordinates and/or angles of the ridge points of the respective ridges of the real-time minutia and the historical minutia one by one to confirm whether the coordinates and/or the angles are similar, e.g., match and/or exceed a desired threshold value. If a ratio of a number of similar ridge points to a number of all ridge points involved in the minutia exceeds a desired and/or preset threshold (e.g., a desired threshold value, etc.), the corresponding minutia matching pair is considered to pass the check; otherwise, the corresponding minutia matching pair is considered to fail to pass the check. Therefore, the accuracy of fingerprint authentication based on the preliminary authentication result may be improved.

In view of this, according to at least one example embodiment of the inventive concepts, a fingerprint authentication method is provided. FIGS. 1A to 1G are flowcharts showing the fingerprint authentication methods according to some example embodiments of the inventive concepts. With reference to FIG. 1A, the fingerprint authentication method includes operations S110 to S130, but the example embodiments are not limited thereto. The operations S110 to S130 may be performed by a fingerprint authentication device shown in FIG. 2, but the example embodiments are not limited thereto.

First, it should be noted that application scenarios of the fingerprint authentication method provided in one or more of the example embodiments of the inventive concepts may include, but are not limited to, fingerprint door locks, fingerprint car locks, fingerprint unlocking of smart devices and/or other computing devices (e.g., computers, storage devices, etc.), fingerprint unlocking of safes, and the like, but are not limited thereto.

Figure 1B:
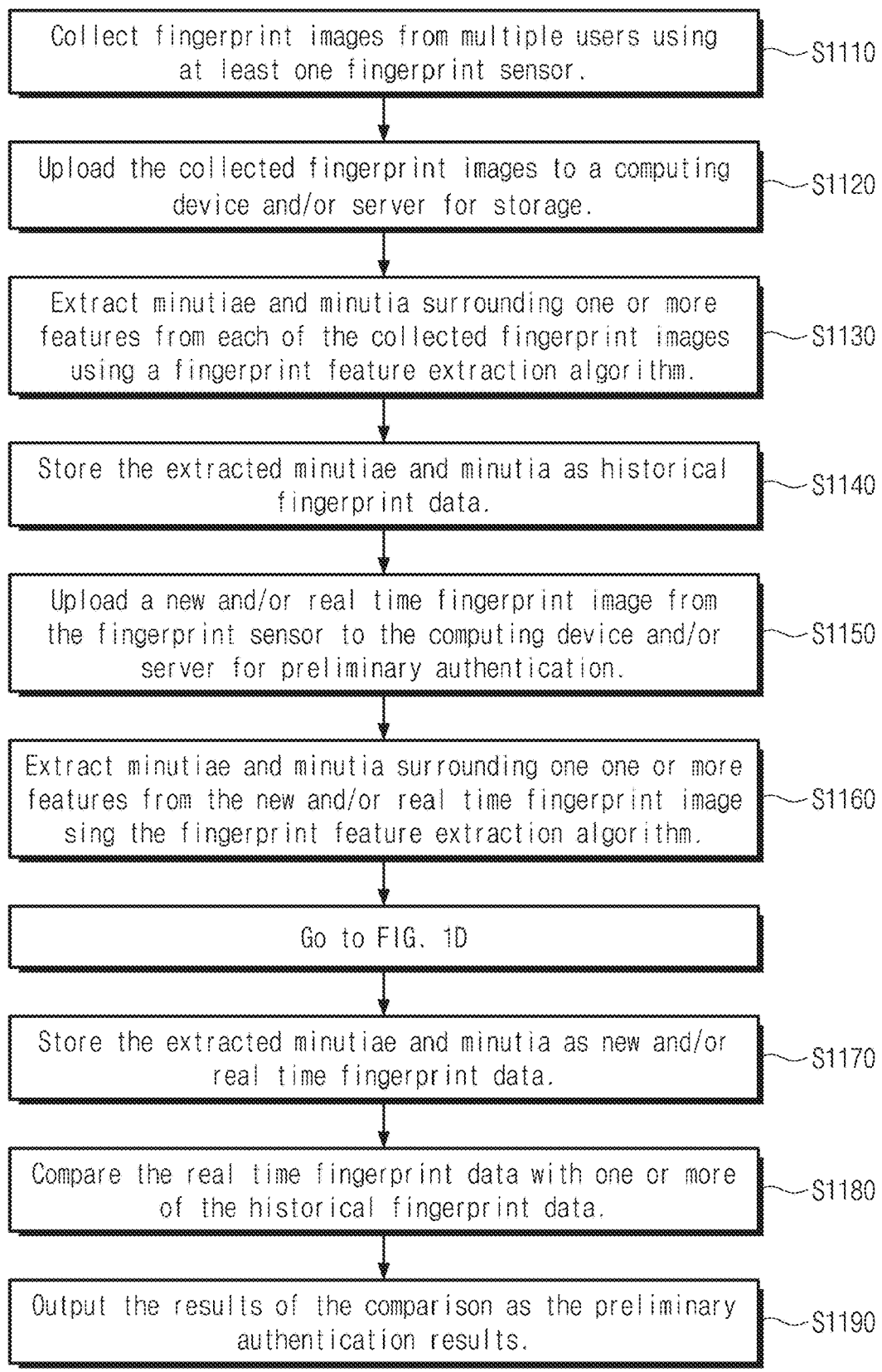

Before performing the above operation S110 of FIG. 1A, the fingerprint authentication method of at least one example embodiment of the inventive concepts may include a method of performing a preliminary authentication on a target fingerprint to obtain a preliminary authentication result as shown in FIG. 1B, but the example embodiments are not limited thereto.

According to at least one example embodiment, the preliminary authentication result may be obtained in various ways. For example, a fingerprint authentication system may be used to implement the above operation. Herein, the fingerprint authentication system may include a fingerprint acquisition sensor (also called a fingerprint sensor, a biometric sensor, etc.) and at least one processor included in, for example, a computing device and/or a server, etc., for comparing fingerprints. Herein, the "target fingerprint" generally refers to a fingerprint that is currently acquired, collected, obtained, sensed, read, etc., from at least one certain user and used to perform fingerprint authentication. Specifically, in operation S1110, the fingerprint images of multiple users may be collected in advance through the fingerprint sensor, and may be uploaded, transferred, and/or transmitted to the computing device and/or server for storage in operation S1120. In operation S1130, the computing device and/or server may analyze and/or extract minutiae and minutia surrounding one or more features from the users' fingerprint images (e.g., the collected fingerprint images, etc.) based on a fingerprint feature extraction algorithm, and in operation S1140, store the analyzed and/or extracted minutiae and minutia as historical fingerprint data for use in future fingerprint comparisons. According to at least one example embodiment, minutiae may refer to a discontinuity in a ridgeline of a fingerprint, or in other words, a point where at least one ridge line of a fingerprint ends, diverges, and/or forks, etc.

When one of the above users enters a fingerprint again (e.g., in the future, a second time, another time, a new fingerprint, etc.), in operation S1150, the fingerprint sensor may transfer, transmit, and/or upload the user's fingerprint collected in real time, for example, to the computing device and/or server, etc., but the example embodiments are not limited thereto. In operation S1160, the computing device and/or server may analyze and/or extract minutiae and minutia surrounding features from the user's fingerprint image uploaded this time (e.g., the new fingerprint image, etc.) based on the fingerprint feature extraction algorithm, and in operation S1170, save the extracted minutiae and minutia of the new fingerprint image as real-time fingerprint data (and/or current fingerprint data, the target fingerprint data, new fingerprint data etc.) for comparison. In operation S1180, the computing device and/or server may use the real-time fingerprint data as the target fingerprint and compare it with the stored historical fingerprint data, and in operation S1190, output and/or use the results of matching the target fingerprint with a historical fingerprint data as the preliminary authentication result of operation S110 of FIG. 1A. In other words, in response to the presence of at least one historical fingerprint image matching a target fingerprint image, the computing device and/or server may output a successful match (e.g., success) result or an unsuccessful match (e.g., failure) result, etc. However, the example embodiments are not limited thereto, and for example, the fingerprint data may be transferred, transmitted, and/or uploaded to the computing device and/or server for analysis on demand and/or at a desired interval, e.g., non-real time, etc.

For another example, the above fingerprint authentication system may be an integrated fingerprint sensor, fingerprint comparison processing unit (e.g., processing circuitry configured to and/or caused to perform fingerprint comparisons, etc.), and/or a local storage unit (e.g., a non-transitory computer storage medium, etc.), thereby realizing localized fingerprint authentication (e.g., performing on-device fingerprint authentication without using an external computing device and/or server, etc.). Specifically, the fingerprint images of at least one user and/or a plurality of users may be collected (e.g., in advance and/or in real-time) through the fingerprint sensor and uploaded to the fingerprint comparison processing unit (e.g., the processing circuitry of the device, etc.). The fingerprint comparison processing unit may extract minutiae and minutia surrounding features from the users' fingerprint images based on the fingerprint feature extraction algorithm, as the historical fingerprint data for comparison and store it in the local storage unit. When one of the above users inputs a fingerprint again, the fingerprint sensor may upload the user's currently collected fingerprint (which may be collected in real time, etc.) to the fingerprint comparison processing unit, and the fingerprint comparison processing unit may extract minutiae and minutia surrounding features from the user's fingerprint image uploaded this time based on the fingerprint feature extraction algorithm, as the real-time fingerprint data and/or current fingerprint data, etc., for comparison, but the example embodiments are not limited thereto. The fingerprint comparison processing unit may then use the real-time fingerprint data and/or current fingerprint data as the target fingerprint data, compare it with the one or more historical fingerprint data stored in the local storage unit, and determine whether the target fingerprint data matches a historical fingerprint data stored in the local storage unit. In the event that a matching fingerprint is found in the local storage unit (e.g., local storage device, etc.), the fingerprint comparison processing unit may use the target fingerprint data and matched historical fingerprint data as the preliminary authentication result in response to the presence of the fingerprint data matching the target fingerprint in the historical fingerprint data. In the event that a matching fingerprint is not found in the local storage unit, the fingerprint comparison processing unit may transmit a result indicating a failure to identify the target fingerprint and/or "no match" message, etc., but the example embodiments are not limited thereto.

According to at least one example embodiment, the preliminary authentication result may also include at least one minutia matching pair of the target fingerprint, and a preliminary matching score corresponding to the minutia matching pair, wherein the minutia matching pair includes a real-time and/or current minutia extracted from the target fingerprint and a historical minutia matching the real-time minutia, etc., but is not limited thereto. In other words, the term "matching pair" may refer to a minutia from the target fingerprint data and a corresponding (e.g., "matched") minutia from the historical fingerprint data, etc., but the example embodiments are not limited thereto.

Herein, the preliminary matching score may be obtained by calculating the minutia matching pair using a traditional and/or known fingerprint matching algorithm, but the example embodiments are not limited thereto. For example, assuming that the calculated score of the minutia matching pair is 60 points, then based on this score (that is, the preliminary matching score), adjustments may be made according to the subsequent checking result, however the example embodiments are not limited thereto and the score may be greater or lesser than 60 points, etc. The specific operations will be described below.

Referring back to FIG. 1A, in operation S110, the preliminary authentication result of the target fingerprint is acquired.

According to at least one example embodiment, the preliminary authentication result of the target fingerprint may be obtained in any known available way. For example, an acquisition unit that performs operation S110 may communicate with the external server and/or external computing device, etc., which performs fingerprint comparison to receive the preliminary authentication result of the target fingerprint transmitted by the server and/or computing device, but the example embodiments are not limited thereto.

Herein, the communication mode between the acquisition unit and the server may include a wireless manner and/or a wired manner. The wireless mode may be, for example, a wireless network (e.g., WiFi, etc.), a mobile communication (for example, 4G, 5G, etc.), ZigBee (Zigbee Protocol), Near Field Communication (NFC), etc. The wired mode may be, for example, optical fiber communication in a local area network, a USB connection, etc., but is not limited thereto.

For another example, the acquisition unit that at least performs operation S110 may be integrated with the above fingerprint comparison processing unit and the local storage unit, etc., and/or the acquisition unit may be included in a user device including the fingerprint comparison processing unit, and/or the local storage unit, etc., but the example embodiments are not limited thereto. In this way, the acquisition unit may read the preliminary authentication result of the target fingerprint locally, so that the subsequent further localized check processing of fingerprint authentication may be realized. In addition, the integrated fingerprint authentication device may be adapted for different environments (for example, a scenario where the signal is bad and a scenario that is inconvenient to communicate with a remote server and/or an external computing device, etc.), and may be convenient for installation and/or implementation, etc.

Figure 1C:
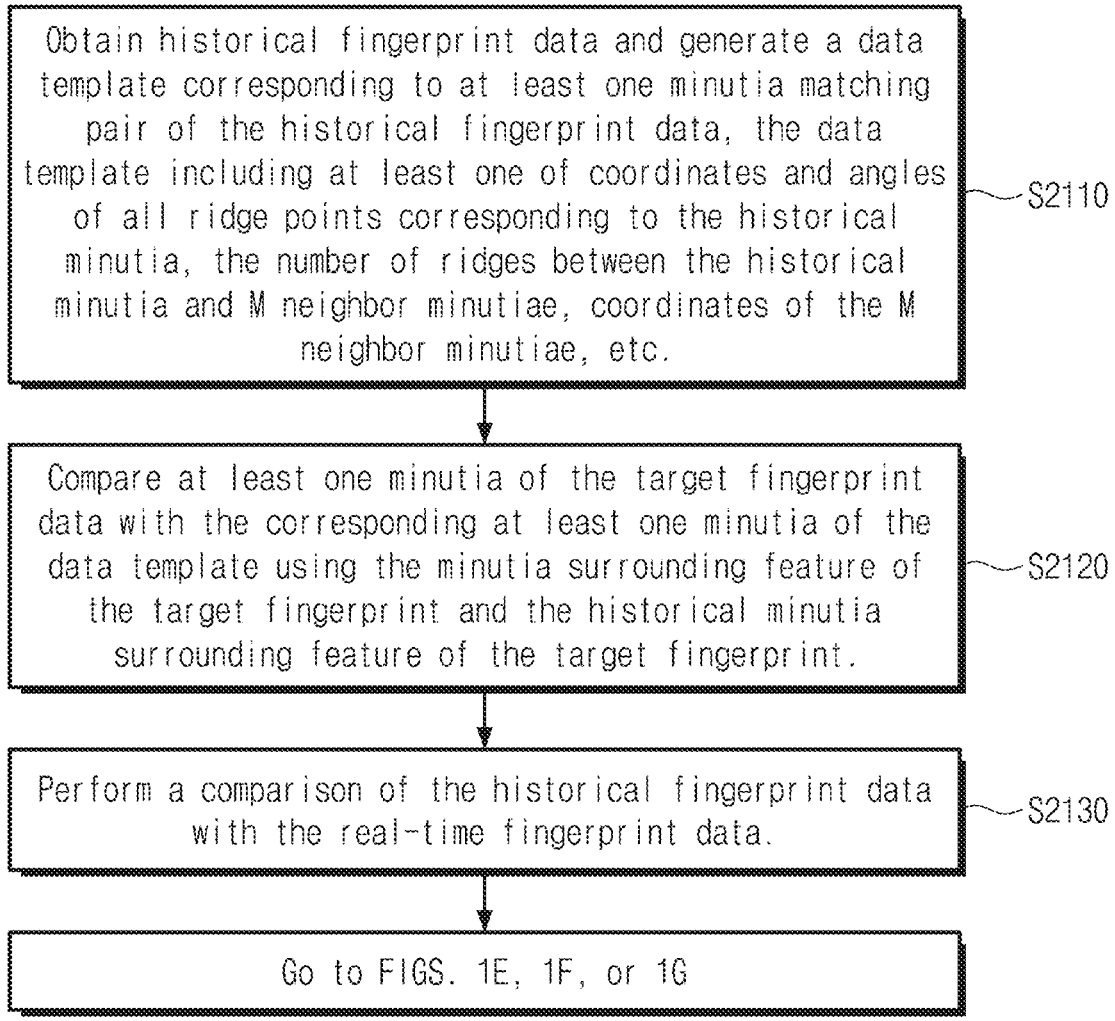

After operation S110, the fingerprint authentication method of at least one example embodiment of the inventive concepts may further include, as shown in FIG. 1C, establishing and/or pre-establishing a data template for checking the at least one minutia matching pair of the target fingerprint.

According to some example embodiments, the data template may be built in a variety of available ways. First, as shown in operation S2110 of FIG. 1C, the fingerprint authentication device may obtain historical fingerprint data of the target fingerprint from the above server and/or external computing device, etc., and the data template may be built, created, generated, etc., by the fingerprint authentication system based on the historical fingerprint data. In at least one other example embodiment, the data template may include historical minutiae and historical minutia surrounding features associated with the historical minutiae. Here, a historical minutia may include at least one coordinate and at least one angle of the historical minutia, etc., but the example embodiments are not limited thereto. For example, according to some example embodiments, the historical minutia may further include at least one historical minutia surrounding feature which may include coordinates and angles of all ridge points corresponding to the historical minutia, and/or a number of ridges (e.g., a count of the number of ridges, etc.) between the historical minutia and M neighbor minutiae, coordinates of the neighbor minutiae and the like, where M is a natural number, but the example embodiments are not limited thereto.

It should be noted here that the data template may be stored according to different implementation schemes. For example, in the above implementation using the server and/or external computing device, the data template may be stored in the above server and/or external computing device; in the foregoing localized implementation, the data template may be stored in the local storage unit, etc.

Referring back to FIG. 1A, in operation S120, a matching check is performed on the preliminary authentication result.

According to at least one example embodiment, the "matching check" of the preliminary authentication result of operation S120 of FIG. 1A described above may be performed in any available manner. For example, as shown in operation S2120 of FIG. 1C, the at least one minutia matching pair of the target fingerprint may be checked based on the data template, but is not limited thereto. Specifically, a real-time and/or current minutia surrounding feature of the target fingerprint may be acquired first; then, based on the real-time minutia and/or current surrounding feature and the historical minutia surrounding feature of the target fingerprint, the at least one minutia matching pair of the target fingerprint is checked and/or compared, etc., but the example embodiments are not limited thereto.

According to at least one example embodiment, the "real-time minutia surrounding feature of the target fingerprint" may be obtained in any available manner. For example, it may be obtained by using the above server and/or external computing device, etc., but the example embodiments are not limited thereto. Specifically, as described in the above, the server and/or external computing device may complete the extraction of the real-time minutia surrounding feature of the target fingerprint according to the fingerprint image uploaded by the user using the feature extraction algorithm. A check unit that performs the above operation of "acquiring the real-time minutia surrounding feature of the target fingerprint" may communicate with the server and/or external computing device to receive the real-time minutia surrounding feature from the server, but the example embodiments are not limited thereto.

Figure 1D:
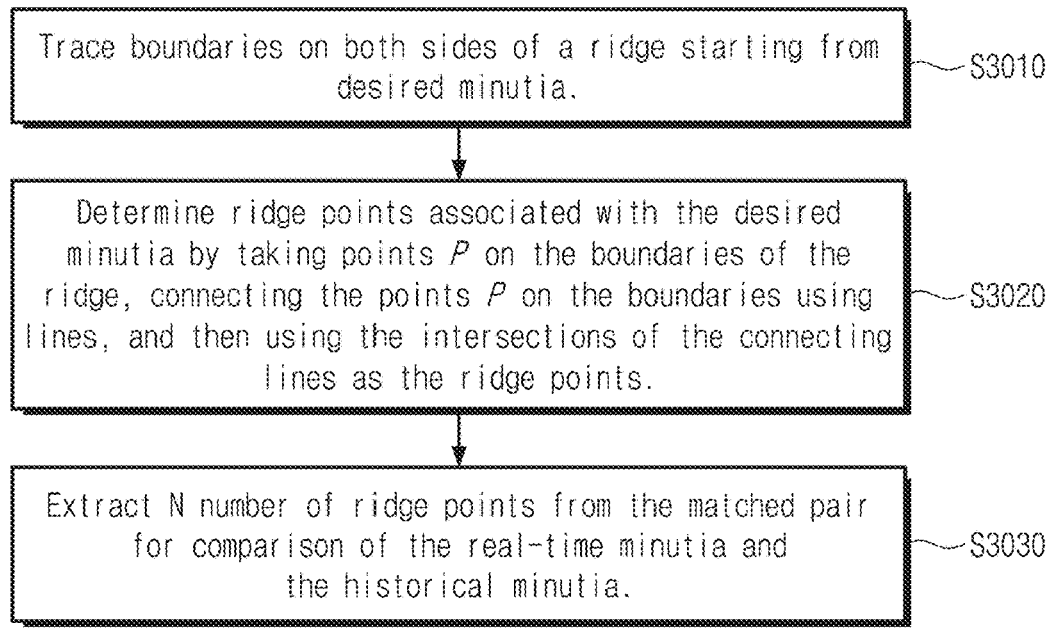

The process of the server and/or external computing device extracting the real-time minutia surrounding feature based on the feature extraction algorithm according to some example embodiments will be discussed in connection with FIGS. 1D and 3. For example, as shown in operation S3010 of FIG. 1D and FIG. 3, the extraction of ridge points in a ridge where minutia a1 is located may be described as an example, but the example embodiments are not limited thereto. First, in operation S3010 of FIG. 1D, the server, external computing device, and/or other fingerprint authentication device (hereinafter, the "device") may trace boundaries on both sides of the ridge (e.g., the boundaries between the ridge and valleys) starting from a desired minutia, e.g., the minutia a1, etc., but the example embodiments are not limited thereto. Second, in operation S3020, the device may determine ridge points associated with the desired minutia by taking one or more points P on the two boundaries of the ridge of the desired minutia respectively in operations of a desired number of pixels, e.g., four pixels, etc., connecting the points P on the two boundaries using lines (e.g., drawing lines connecting the points P, etc.), and using the intersections of the connecting lines and the ridge as the ridge points, etc. Third, in operation S3030, the device may extract a number N of ridge points for use in the comparison of the real-time minutia and the historical minutia, wherein the number N is set as desired and/or based on requirements, etc., but the example embodiments are not limited thereto, and for example, N may be 10, etc. In the case where the length of the ridge is not long enough to extract the desired and/or preset number N of ridge points, the ridge points may be extracted according to the actual length of the ridge, but the example embodiments are not limited thereto.

According to some example embodiments, a variety of available methods may be used to perform the above operation of "performing the matching check on the at least one minutia matching pair of the target fingerprint". For example, In an example embodiment 1:

The real-time (e.g., current) minutia surrounding a feature may include multiple real-time ridge points corresponding to the ridge where the real-time minutia is located, and the historical minutia surrounding feature may include multiple historical ridge points of the ridge where the historical minutia is located, etc.

The minutia refers to end points and/or bifurcation points of a fingerprint ridge. With reference to FIG. 3, real-time minutiae may include, for example, a1, a2, a3, a4 and/or a5, and historical minutiae may include b1, b2, b3, b4, b5, b7 and/or b8, but the example embodiments are not limited thereto. As an example, as shown in FIG. 3, the ridge where each real-time minutia is located may include multiple real-time ridge points, for example, the ridge where the real-time minutia a1 is located includes multiple real-time ridge points including real-time ridge points 1 and 2, but the example embodiments are not limited thereto. Similarly, the ridge where each historical minutia is located may include multiple historical ridge points, but the example embodiments are not limited thereto. For example, the ridge where the historical minutia b1 is located includes multiple historical ridge points including historical ridge points 1 and 2, etc.

Figure 1E:
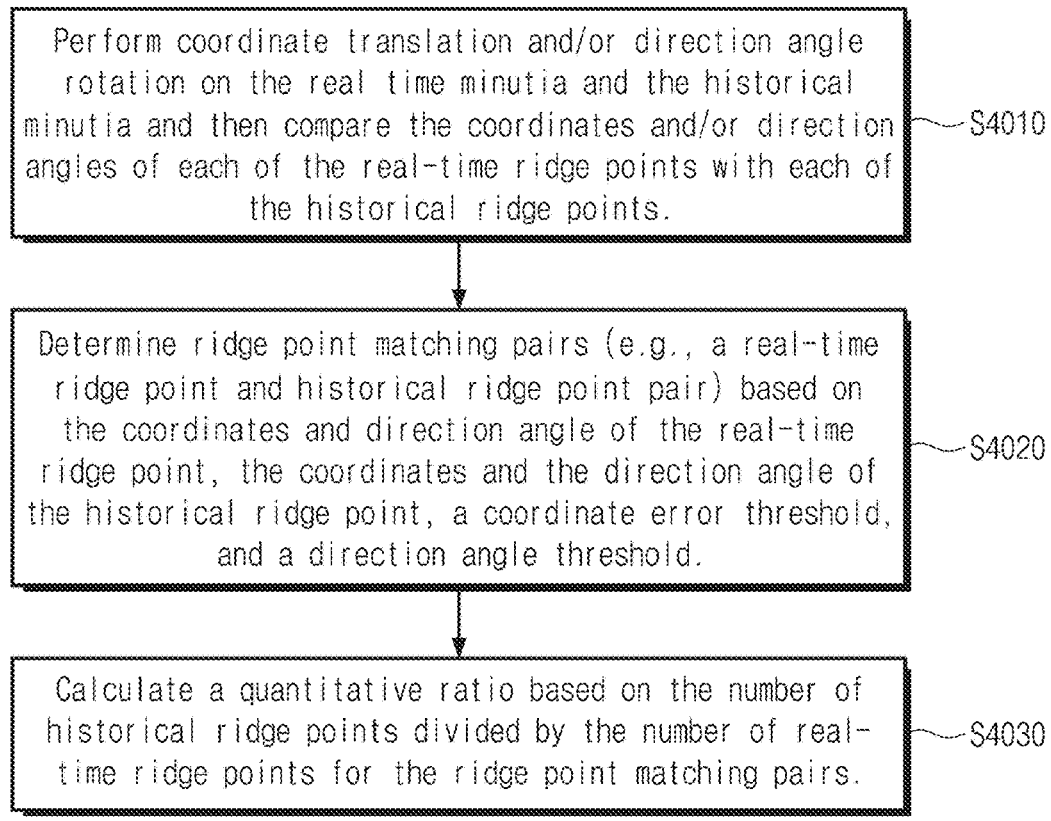

In at least one example embodiment, the operation of performing the check on the at least one minutia matching pair of the target fingerprint may be based on the real-time minutia surrounding feature and the historical minutia surrounding feature of the target fingerprint, and may include the following operations as shown in FIG. 1E, but the example embodiments are not limited thereto.

In operation S4010 of FIG. 1E, coordinates and/or direction angles between the multiple real-time ridge points and the multiple historical ridge points are compared one by one. Specifically, a rotation and/or translation factor for each of the ridge points is determined based on the real-time minutia and the historical minutia, and coordinate translation and/or direction angle rotation is performed on the multiple historical ridge points by using the determined rotation and/or translation factor in order to normalize the ridge points and facilitate the comparison of the respective ridge points.

Figure 3:
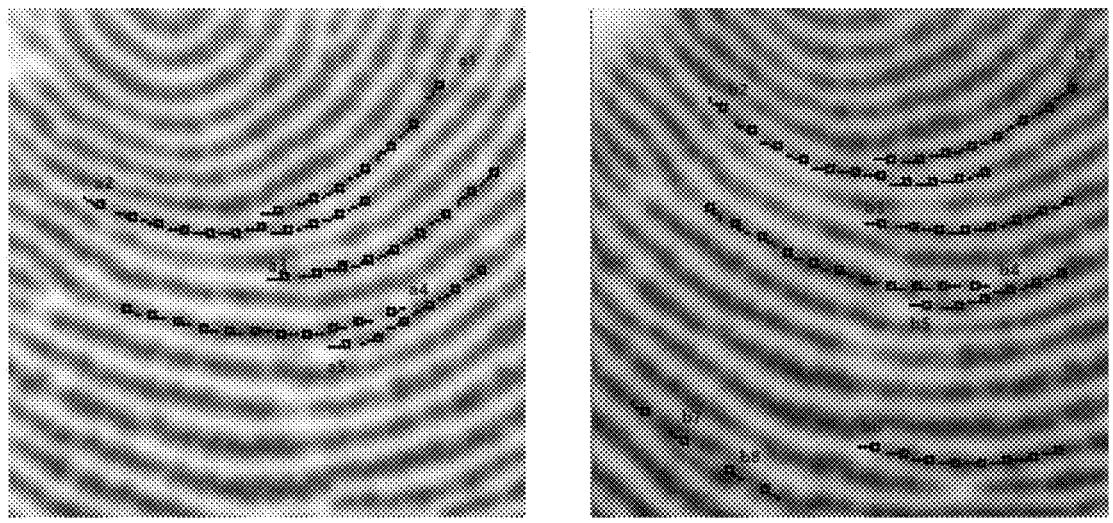
FIG. 3 is a diagram showing an application example of a fingerprint authentication method according to at least one example embodiment of the inventive concepts.

Referring to FIG. 3, the left side of FIG. 3 is a real-time minutia image of the target fingerprint (e.g., a user's fingerprint), and the right side is a historical minutia image of the target fingerprint. According to at least one example embodiment, the coordinate translation and direction angle rotation may be performed using rectangular plane coordinate systems which are established with the lower left corners of the left and right images set as the origins, respectively, and the coordinate system of the left image is called coordinate system $XO_1Y$, and the coordinate system of the right image is called coordinate system $XO_2Y$, but the example embodiments are not limited thereto. The coordinates and/or angle of the pixel where the real-time minutia a1 is located are determined based on the coordinate system $XO_1Y$, and the coordinates and/or angle of the pixel where the historical minutia b1 is located are determined based on the coordinate system $XO_2Y$, etc. Using planar analytical geometry, the rotation and/or translation factor between the coordinate system $XO_1Y$ and the coordinate system $XO_2Y$ is calculated based on the coordinates and/or angle of the pixel where the real-time minutia a1 is located and the coordinates and/or angle of the pixel where the historical minutia b1 is located. Herein, the "angle" may be a direction angle of the tangent at the ridge position where the minutia and/or the ridge point is located with respect to the positive direction of the X axis of the coordinate system. For different minutiae (e.g., non-matching minutiae, etc.), the ridge points are different. Because different minutiae (e.g., non-matching minutiae, etc.) have different positions in the respective ridges, their corresponding "angles" are different and/or distinguishable.

Then, based on the rotation and translation factor, the coordinate translation and/or direction angle rotation on the ridge points in the ridge where the historical minutia b1 is located is performed, so that the historical minutia b1 and the real-time minutia a1 are in the same coordinate system to facilitate comparison.

In operation S4020, a pair of a real-time ridge point and a historical ridge point whose coordinate error is less than a first threshold value (e.g., a coordinate error threshold value) and/or direction angle error is less than a second threshold value (e.g., a direction angle error threshold value) is determined as a ridge point matching pair. In other words, a first real-time ridge point may be compared with a first historical ridge point and a match may be determined between the first real-time ridge point and the first historical ridge point based on the first threshold value and/or second threshold value, etc., but the example embodiments are not limited thereto. If the first historical ridge point does not match with the first real-time ridge point, a second (and/or next) historical ridge point may be compared with the first real-time ridge point, etc., until a matching pair is determined, etc.

Referring to FIG. 3, it is now assumed that the target fingerprint (e.g., the user's fingerprint) includes 5 minutia matching pairs, which may be specifically a1 and b1, a2 and b2, a3 and b3, a4 and b4, a5 and b5. For each minutia matching pair, the first few ridge points may be compared one by one. For example, the first 5 ridge points of the ridge where a1 is located are compared with the first 5 ridge points of the ridge where b1 is located one by one. As for a2 and b2, a3 and b3, a4 and b4, and a5 and b5, they may also be compared in a similar way to a1 and b1.

The example embodiments of the inventive concepts do not limit the first threshold value and the second threshold value, and the first threshold value and the second threshold value may be adjusted according to different actual needs, the specifications of the fingerprint sensor, and/or based on experiential data, etc. It may be understood that the smaller the respective values of the first threshold value and the second threshold value are, the higher the accuracy of the determined ridge point matching pairs is; and conversely, the larger the respective values of the first threshold value and the second threshold value are the lower the accuracy is. Additionally, according to at least one example embodiment, the first threshold value may be 4 pixels, and the second threshold value may be $\pi/6$, but the example embodiments are not limited thereto.

In operation S4030, a ratio of the number of ridge points (e.g., the ridge count) included in the minutia matching pairs of the historical minutia image (e.g., b1, b2, b3, b4, and b5 of FIG. 3) to the number of ridge points in the real-time minutia image (e.g., a1, a2, a3, a4, and a5 of FIG. 3) is calculated and output as the result of the matching check.

According to at least one example embodiment, referring to FIG. 3, it is assumed that the number of ridge points in the ridges involved in the real-time minutiae a1 to a5 is M, and the number of real-time ridge points involved in the determined ridge point matching pairs is N, then the ratio is N/M, where M and N are integers.

In an example embodiment 2:

The real-time minutia surrounding feature includes the number of real-time ridges (e.g., the number of ridges present in the real-time and/or current fingerprint data, etc.) between the real-time minutia and each of a plurality of neighbor real-time minutiae, and the historical minutia surrounding feature includes the number of historical ridges between the historical minutia and each of a plurality of neighbor historical minutiae, but the example embodiments are not limited thereto.

Figure 1F:
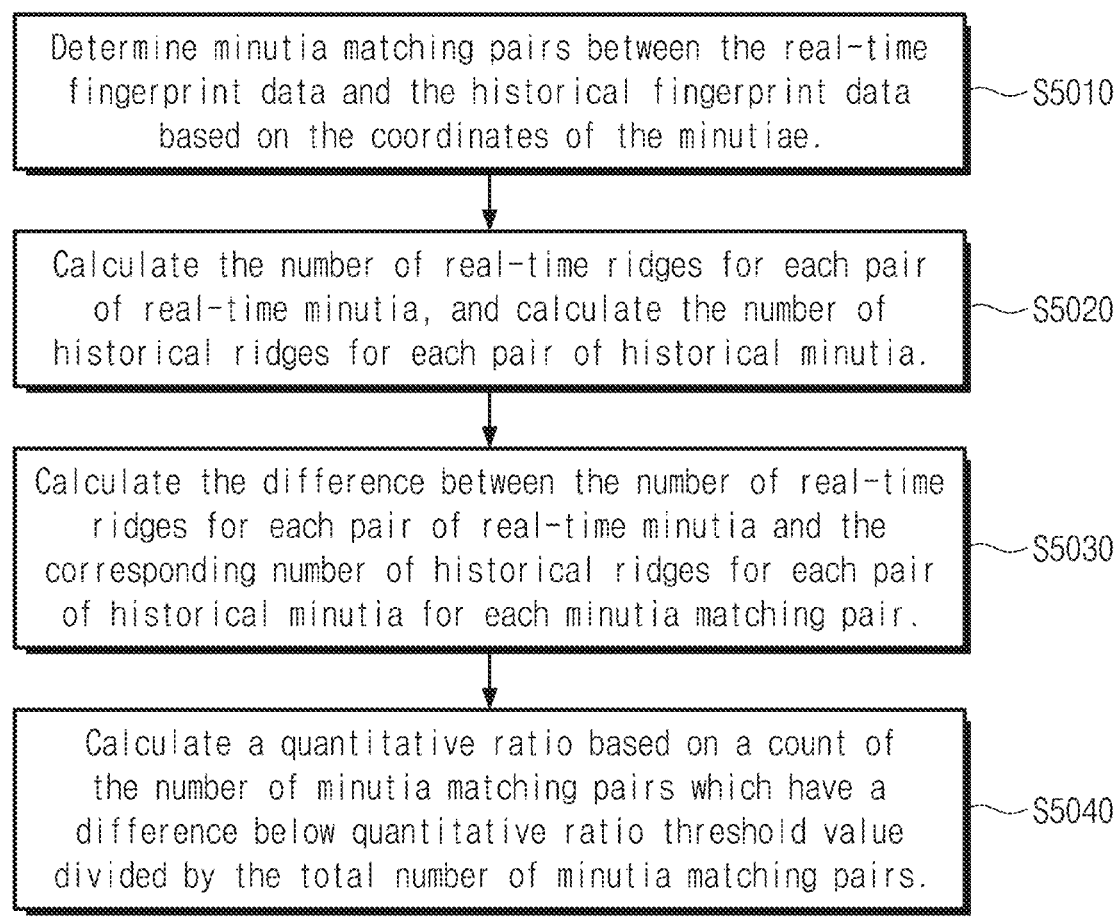

According to at least one example embodiment, the operation of performing the matching check on the at least one minutia matching pair of the target fingerprint may be based on the real-time minutia surrounding feature and the historical minutia surrounding feature of the target fingerprint, and may include the operations illustrated in FIG. 1F.

In operation S5010, a matching relationship between multiple real-time minutiae and multiple historical minutiae may be determined according to the at least one minutia matching pair of the target fingerprint.

According to at least one example embodiment, the at least one minutia matching pair of the target fingerprint may be determined from the preliminary authentication result of the target fingerprint obtained from the server and/or external computing device, but the example embodiments are not limited thereto. Therefore, the matching relationship between the multiple real-time minutiae and the multiple historical minutiae of the target fingerprint may be determined according to the minutia matching pair. For example, referring to FIG. 4, it may be determined that the real-time minutia a1 matches the historical minutia b1, the real-time minutia a2 matches the historical minutia b2, and the real-time minutia a3 matches the historical minutia b3, etc., but the example embodiments are not limited thereto.

In the process of determining the minutia matching pair, the server and/or external computing device may search based on the coordinates of the minutiae. Specifically, the server and/or external computing device may separately extract the coordinates of the real-time minutiae and the historical minutiae through the feature extraction algorithm, and then determine the minutia point matching pair based on the positional relationship between the coordinates, but are not limited thereto.

In operation S5020, a plurality of real-time minutia pairs and a plurality of corresponding historical minutia pairs are determined in pairs according to the matching relationship. Additionally, a number of real-time ridges between each of the plurality of real-time minutia pairs and a number of historical ridges between each of the plurality of historical detail pairs are calculated respectively, as well as a ratio of a number of real-time minutia pairs whose difference between a number of real-time ridges and a number of corresponding historical ridges is less than a third desired threshold to a number of the plurality of real-time minutia pairs is determined as the result of the matching check, but the example embodiments are not limited thereto.

Figure 4:
FIG. 4 is a diagram showing another application example of a fingerprint authentication method according to at least one example embodiment of the inventive concepts.

Referring to FIG. 4, the left fingerprint image is an example of a real-time fingerprint image and includes three real-time minutiae a1, a2, and a3, and the plurality of real-time minutia pairs that are determined in pairs are three pairs a1,a2; a1,a3; a2,a3, wherein, the number$\alpha 1$ of real-time ridges between the real-time minutiae a1 and a2 is 9; the number$\alpha 2$ of real-time ridges between the real-time minutiae a1 and a3 is 8; and the number$\alpha 3$ of real-time ridges between the real-time minutiae a2 and a3 is 0, but the example embodiments are not limited thereto. The right fingerprint image is an example of a historical fingerprint image and includes three historical minutiae b1, b2, and b3, the plurality of historical minutia pairs that are determined in pairs are three pairs b1,b2; b1,b3; b2,b3, wherein, the number$\beta 1$ of historical ridges between the historical minutiae b1 and b2 is 6; the number$\beta 2$ of historical ridges between the historical minutiae b1 and b3 is 7; and the number$\beta 3$ of historical ridges between the historical minutiae b2 and b3 is 0, but the example embodiments are not limited thereto.

In operation S5030, according to at least one example embodiment, the difference between the number of real-time ridges and the number of historical ridges for each minutia matching pair (calculated in S5010) is calculated. Using FIG. 4 as an example, the difference$\delta 1$ between the number$\alpha 1$ of the real-time ridges and the number$\beta 1$ of the historical ridges is 3; the difference$\delta 2$ between the number$\alpha 2$ of the real-time ridges and the number$\beta 2$ of the historical ridges is 1; and the difference$\delta 3$ between the number$\alpha 3$ of the real-time ridges and the number$\beta 3$ of the history ridges is 0, but the example embodiments are not limited thereto.

In operation S5040, a quantitative ratio is determined by determining the number of minutia matching pairs having a difference below a quantitative ratio threshold value (e.g., a third desired threshold value) over the total number of minutia matching pairs. Using FIG. 4 as an example and assuming that the third desired threshold value (e.g., the quantitative ratio threshold value) is 2, among the three groups of the numbers$\alpha 1$ of the real-time ridges to the number$\alpha 3$ of the real-time ridges, the difference values$\delta 2$ and$\delta 3$ corresponding to$\alpha 2$ and$\alpha 3$ are smaller than the third threshold value, that is, the real-time minutia pairs a1,a3; a2,a3 meet that the difference is less than the third threshold value, thus the "quantitative ratio" is 2/3, but the example embodiments are not limited thereto.

Of course, the foregoing is only an example, and the example embodiments do not limit the third desired threshold value, the third desired threshold value may be adjusted according to user requirements, actual fingerprint matching performance, experiential data, etc.

In an example embodiment 3:

According to at least one example embodiment, the operation of performing the matching check on the at least one minutia matching pair of the target fingerprint may be based on a generated data template, such as a data template generated as discussed in connection with FIG. 1C, but the example embodiments are not limited thereto.

Figure 1G:
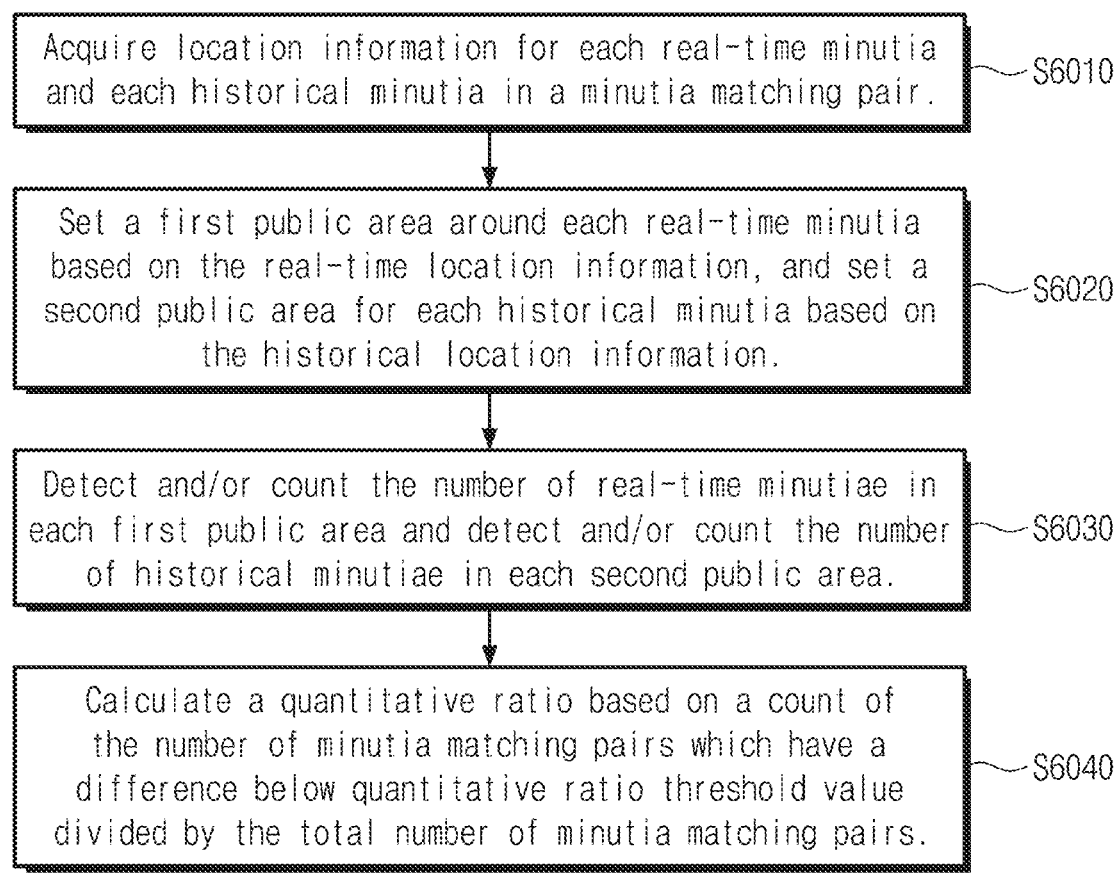

In operation S6010 of FIG. 1G, real-time (e.g., current) location information (e.g., coordinate information) of a real-time (e.g., current) minutia involved in each minutia matching pair is acquired, and historical location information of a historical minutia involved in each minutia matching pair is acquired from the data template according to the historical minutia.

According to at least one example embodiment, the real-time location information of the real-time minutia may be extracted (and/or directly extracted) by using the feature extraction algorithm and the local user device, and/or the extraction may also be performed with the above server and/or external computing device. The data template may be referred to the discussion above, which is not repeated here. Herein, the real-time location information and the historical location information may both be coordinates, but the example embodiments are not limited thereto.

In operation S6020, a first public area of each real-time minutia is set and/or determined based on corresponding real-time location information, and a second public area of each historical minutia is set and/or determined based on corresponding historical location information, but are not limited thereto.

According to at least one example embodiment, the first public area and the second public area may be set and/or determined in multiple ways. In at least one example embodiment, the first public area refers to a largest circular area centered on the coordinates of the real-time minutia which does not exceed the boundary of the real-time fingerprint image; the second public area refers to the largest circular area centered on the coordinates of the historical minutia which does not exceed the boundary of the historical fingerprint image, but the example embodiments are not limited thereto, and for example, the first and second public areas may be other shapes besides circles, etc.

Figure 5:
FIG. 5 is a diagram showing another application example of a fingerprint authentication method according to at least one example embodiment of the inventive concepts.

For example, referring to FIG. 5, the left part is a real-time fingerprint image associated with and/or corresponding to a user and includes real-time minutiae a1, a2, and a3, and the first public areas corresponding to the real-time minutiae are determined as the largest circular areas centered on the coordinates of a1, a2, and a3, respectively, which do not exceed the boundary of the fingerprint image, but the example embodiments are not limited thereto. The right part is a historical fingerprint image associated with and/or corresponding to the user and includes historical minutiae b1, b2, b3, and the second public areas corresponding to the historical minutiae are determined as the largest circular areas centered on the coordinates of b 1, b2, and b3, respectively, which do not exceed the boundary of the fingerprint image, but the example embodiments are not limited thereto.

Additionally, in addition to the circle, a triangle, a rectangular and/or other polygonal areas may be drawn with the coordinates of the real-time minutiae, e.g., a1, a2, a3, etc., and/or the historical minutiae, e.g., b 1, b2, b3, etc., as the centers, respectively, but the example embodiments are not limited thereto.

In operation S6030, a first number of real-time minutiae in each first public area is detected, and a second number of historical minutiae in each second public area is detected, but the example embodiments are not limited thereto.

More specifically, during operation S6030, a first number of real-time minutiae is counted in each circular area of the first public area and/or a second number of historical minutiae is counted in each circular area of the second public area, etc.

In operation S6040, a quantitative ratio is calculated by determining a ratio of the number of real-time minutiae whose difference between the first number and the second number is less than a fourth desired threshold to the number of real-time minutiae in the at least one minutia matching pair based on a matching relationship of the minutia matching pair. According to some example embodiments, the ratio is provided as the result of the matching check, etc., but the example embodiments are not limited thereto.

Referring to FIG. 5, the matching relationship may indicate that the real-time minutia a1 matches the historical minutia b1; the real-time minutia a2 matches the historical minutia b2; and/or the real-time minutia a3 matches the historical minutia b3, but the example embodiments are not limited thereto. Assuming that the difference between the first number corresponding to a1 and the second number corresponding to b1 is less than a fourth desired threshold (e.g., a difference threshold value, etc.), the difference between the first number corresponding to a2 and the second number corresponding to b2 is less than the fourth desired threshold, and the difference between the first number corresponding to a3 and the second number corresponding to b3 is greater than the fourth desired threshold, the result of the matching check may indicate that the "quantitative ratio" is 2/3, but the example embodiments are not limited thereto.

Of course, the foregoing description is only an example, and the example embodiments are not limited thereto, and may also include other possible quantitative ratios.

Additionally, the example embodiments of the inventive concepts do not limit the fourth desired threshold value, and the fourth threshold value may be adjusted according to actual needs, for example, the value may be 1, 2, etc.

Referring back to FIG. 1A, in operation S130, a final authentication result of the target fingerprint is determined based on the result of the matching check.

According to at least one example embodiment, the preliminary matching score is adjusted based on the result of the matching check, in the case that the adjusted preliminary matching score is greater than a desired and/or preset matching score threshold, the final authentication result of the target fingerprint indicates that the fingerprint authentication passes; in the case that the adjusted preliminary matching score is less than or equal to the desired and/or preset matching score threshold, the final authentication result of the target fingerprint indicates that the authentication fails.

According to at least one example embodiment, the result of the matching check includes the following three cases, but are not limited thereto. Among them, the first result of the matching check is the quantitative ratio of "ridge points"; the second result of the matching check is the quantitative ratio of "ridges"; the third result of the matching check is the quantitative ratio of "minutiae", but the example embodiments are not limited thereto.

Based on the above three methods of performing the matching check, the operation S130 of FIG. 1A of "adjusting the preliminary matching score based on the result of the matching check" may include dividing an adjustment level of the preliminary matching score based on the size of the "quantitative ratio", for example, in the case that the quantitative ratio is greater than a desired and/or certain threshold (e.g., a desired adjustment threshold), wherein the larger the quantitative ratio is, the more the score increases, and the smaller the quantitative ratio, the less the score increases. Conversely, if the quantitative ratio is less than the desired and/or certain threshold (e.g., the desired adjustment threshold), the larger the quantitative ratio is, the less the score reduces, and otherwise, the more the score reduces.

Wherein, the "desired and/or certain threshold" (e.g., the desired adjustment threshold) and "desired and/or preset matching score threshold" may be set according to user requirements, design considerations, experiential data, etc., but the example embodiments are not limited thereto.

According to some example embodiments, the adjustment rule of "adjusting the preliminary matching score based on the result of the matching check" may be based on the "quantitative ratio," and the quantitative ratio may be expressed in the form of a percentage. For example, assuming that the "desired and/or certain threshold" is 50%, and 50% is taken as a reference point, one level is adjusted upwards every 5 percentage points increase, the corresponding adjustment score is increased by 5 percentage points on the basis of the preliminary matching score, etc., but the example embodiments are not limited thereto, and may use different reference values and/or level values, etc. Similarly, if 50% is again taken as the reference point, one level is adjusted downwards every 5 percentage points reduce, the corresponding adjustment score is reduced by 5 percentage points on the basis of the preliminary matching score, but the example embodiments are not limited thereto.

For any of the above cases regarding the quantitative ratio of "ridge points", the quantitative ratio of "ridges" and/or the quantitative ratio of "minutiae", the adjustment rule of the above example embodiment may be used for adjusting the score, but the example embodiments are not limited thereto and other values may be used. For example, for the case regarding the quantitative ratio of "ridge points", assuming that the preliminary matching score is 60 points, when the calculated "quantitative ratio" is 65%, the quantitative ratio value of 65% is 15 percentage points greater relative to the previous example quantitative ratio value of 50%, therefore, the authentication score is adjusted three levels upwards according to the above adjustment rule, that is, the corresponding adjustment score is increased by 15 points on the basis of the preliminary matching score of 60 points, and the adjusted score, e.g., the final authentication result, is 75 points, but the example embodiments are not limited thereto.

In addition, when performing the above matching check for the same target fingerprint, it may be performed based on any of the above implementations of the matching check, but the example embodiments are not limited thereto. Among them, when multiple implementations are used to perform the check, the preliminary matching score may be individually adjusted based on each check method to obtain the corresponding adjusted score results, and then the adjusted score results corresponding to each check method are averaged as the final score result.

Or, in another example embodiment, the above "adjusting the preliminary matching score based on the result of the matching check" may be performed in the following manner.

According to the results of the above three matching checks, the "quantitative ratios" may be set as the corresponding quantitative scores. The increase or decrease of the quantitative scores reflects directly on the matched minutiae and/or the minutia surrounding features. Then the preliminary matching score is adjusted based on the corresponding calculation rule.

For example, the "quantitative ratio" is expressed in the form of a percentage, and the corresponding quantitative score is expressed as an integer. Assuming that the preliminary matching score is 50, the corresponding quantitative ratio is 50%, the corresponding quantitative score may also be recorded as 50. Taking 50 as the reference point, the quantitative ratio is adjusted upwards by one level every 5 percentage points increase, and the corresponding quantitative score is increased by 5 points on the basis of the reference point, and then the quantitative index corresponding to the matched minutia or the minutia surrounding feature is increased by 1; otherwise, the quantitative ratio is adjusted downwards by one level every 5 percentage points reduce, and the corresponding quantitative score is reduced by 5 points on the basis of the reference point, and then the quantitative index corresponding to the matched minutia or the minutia surrounding feature is reduced by 1, but the example embodiments are not limited thereto.

Then, the matching score is recalculated based on the adjusted quantitative index corresponding to the matched minutia and/or the minutia surrounding feature to realize the adjustment of the preliminary matching score.

Among them, the rule for calculating the matching score using the quantitative index corresponding to the matched minutia and/or the minutia surrounding feature includes, but are not limited to:

(1) regarding the quantitative ratio of "ridge points", the calculation rule may be (currently matched ridge points of the target fingerprint*historically matched ridge points of the target fingerprint)/(currently actually detected ridge points of the target fingerprint*historically stored ridge points of the target fingerprint);

(2) regarding the quantitative ratio of "ridges", the calculation rule may be (the number of currently matched ridges of the target fingerprint*the number of historically matched ridges of the target fingerprint)/(the number of currently actually detected ridges of the target fingerprint*the number of historically stored ridges of the target fingerprint);

(3) regarding the quantitative ratio of "minutiae", the calculation rule may be (the number of currently matched minutiae of the target fingerprint*the number of historically matched minutiae of the target fingerprint)/(the number of currently actually detected minutiae of the target fingerprint*the number of historically stored minutiae of the target fingerprint).

The following takes rule (1) regarding the quantitative ratio of "ridge points" as an example for specific description, but the example embodiments are not limited thereto.

In the case of adjusting upwards: assuming that the "quantitative ratio" is 65%, the quantitative ratio is 15% greater than the reference point of 50%, therefore, 3 levels may be adjusted upwards according to the rule, and the corresponding quantitative score is increased by 15 points in the basis of the reference point. Consequently, the number of currently matched ridge points and/or the number of historically matched ridge points are increased by 3 respectively, the number of currently actually detected ridge points*the number of historically stored ridge points remains unchanged, and a new matching score may be calculated which provides an adjustment to the preliminary matching score.

In the case of adjusting downwards: assuming that the "quantitative ratio" is 40%, the quantitative ratio is reduced by 10% compared to the reference point of 50%, therefore, 2 levels may be adjusted downwards according to the rule, and the corresponding quantitative score is reduced by 10 points in the basis of the reference point, etc. Accordingly, the number of the currently matched ridge points and/or the number of historically matched ridge points are reduced by 2 respectively, and the number of currently actually detected ridge points*the number of historically stored ridge points remains unchanged, and a new matching score may be calculated which provides an adjustment to the preliminary matching score.

For the quantitative ratios of (2) and (3) above, the discussion regarding the rule of (1) may be equally applicable, and therefore they will not be repeated here.

Of course, the foregoing is only a specific example. The example embodiments of the inventive concepts do not limit the specific implementation of "adjusting the preliminary matching score based on the result of the matching check", and may also include other possible situations, and/or the preliminary matching score may be adjusted based on actual situations and/or needs, design considerations, actual performance results, etc.

In summary, the fingerprint authentication method provided by the example embodiments of the inventive concepts may perform the matching check on the minutia matching pair involved in the preliminary authentication result by acquiring the minutia surrounding feature, and adaptively adjusting the matching score based on the result of the check, thereby improving the accuracy of minutia matching, reducing the probability of mis-authentication of a fingerprint (e.g., providing false positive fingerprint authentication results), and/or ensuring the security of user equipment information while improving user experience, etc.

In addition, the matching check algorithms of the example embodiments of the inventive concepts are lightweight and/or do not require extra processing and/or memory resources, and therefore will not increase the complexity of the minutia fingerprint matching algorithm and/or may be applied to lightweight embedded devices (e.g., devices with limited computational resources, etc.), such as smart cards, etc.

Figure 2:
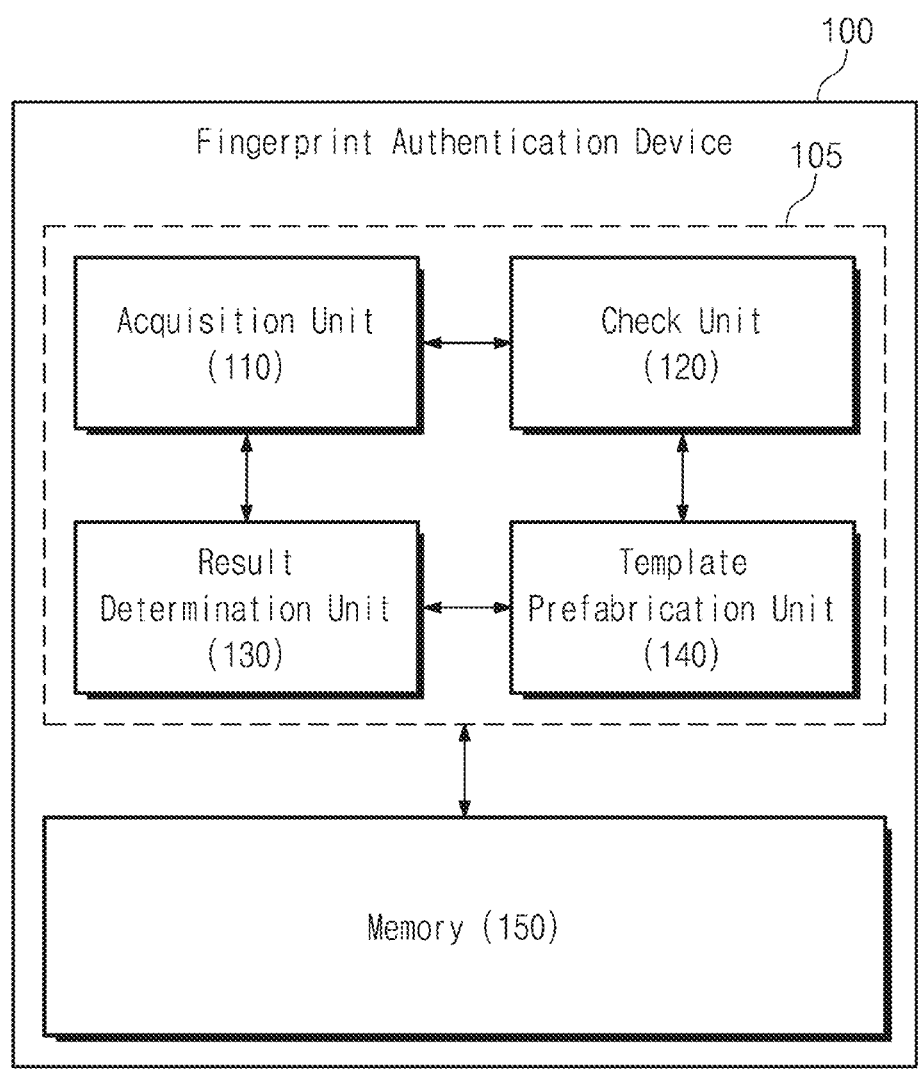
FIG. 2 is a block diagram showing a fingerprint authentication device according to at least one example embodiment of the inventive concepts.

According to another aspect of at least one example embodiment of the inventive concepts, there is provided a fingerprint authentication device, wherein, referring to FIG. 2, the fingerprint authentication device includes processing circuitry 105 communicatively coupled to a memory device 150 (e.g., memory, non-transitory memory, storage device, etc.), etc., via at least one bus (not shown), but the example embodiments are not limited thereto, and for example, the fingerprint authentication device 100 may include a greater or lesser number of constituent elements, such as a wireless communication interface (e.g., a WiFi communication radio, a NFC communication radio, etc.), a wired communication interface (e.g., a USB interface, etc.), input/output devices, a display panel, etc. According to some example embodiments, the processing circuitry 105 may include functional units, such as an acquisition unit 110, a check unit 120, and/or a result determination unit 130, etc., but the example embodiments are not limited thereto. According to some example embodiments, the processing circuitry 105 may be capable of performing the functionality of one or more of the acquisition unit 110, check unit 120, and/or the result determination unit 130, etc., but is not limited thereto. The processing circuitry may include hardware, such as processors, processor cores, logic circuits, storage devices, etc.; a hardware/software combination such as at least one processor core executing software and/or executing any instruction set, etc.; or a combination thereof. For example, the processing circuitry more specifically may include, but is not limited to, a field programmable gate array (FPGA), a programmable logic unit, an application-specific integrated circuit (ASIC), a System-on-Chip (SoC), etc. According to some example embodiments, the memory 150 may include one or more non-transitory computer readable medium(s) having computer readable program code embodied thereon. The computer readable program code may be provided to a processor of a general purpose computer, special purpose computer, or other programmable data processing apparatus. The computer readable medium may be a non-transitory computer readable storage medium. The non-transitory computer readable storage medium may be any tangible medium that can contain or store a program for use by or in connection with an instruction execution system, apparatus, or device, such as an optical disk, a hard drive, a solid state drive, RAM, ROM, etc.

The acquisition unit 110 may be configured to acquire a preliminary authentication result of a target fingerprint via at least one fingerprint sensor (not shown); the check unit 120 may be configured to perform a matching check on the preliminary authentication result; and/or the result determining unit 130 may be configured to determine a final authentication result of the target fingerprint based on a result of the matching check, etc.

It should be understood that the aforementioned specific features of the fingerprint authentication method described in the example embodiments may also be similarly applied to the fingerprint authentication device for similar extensions. For the sake of clarity and brevity, such modifications are not described in detail.

Additionally, the preliminary authentication result includes at least one minutia matching pair of the target fingerprint and a preliminary matching score corresponding to the minutia matching pair, wherein the minutia matching pair includes a real-time minutia extracted from the target fingerprint and a historical minutia matching the real-time minutia Additionally, the processing circuitry 105 of the fingerprint authentication device 100 may further include a template prefabrication unit 140, the template prefabrication unit 140 may be configured to pre-establish a data template for checking the at least one minutia matching pair of the target fingerprint, and the check unit 120 may be further configured to perform the matching check on the at least one minutia matching pair of the target fingerprint based on the data template, etc., but the example embodiments are not limited thereto.

Additionally, the data template includes historical minutiae and historical minutia surrounding features associated with the historical minutiae, the check unit 120 may be further configured to acquire a real-time minutia surrounding feature of the target fingerprint and perform the matching check on the at least one minutia matching pair of the target fingerprint based on the real-time minutia surrounding feature and a historical minutia surrounding feature of the target fingerprint, etc., but the example embodiments are not limited thereto.

Additionally, the real-time minutia surrounding feature includes a plurality of real-time ridge points of a ridge where the real-time minutia is located; the historical minutia surrounding feature includes a plurality of historical ridge points of a ridge where the historical minutia is located, the check unit 120 may be further configured to: compare coordinates and/or direction angles between the plurality of real-time ridge points and the plurality of historical ridge points one by one; determine a pair of a real-time ridge point and a historical ridge point whose coordinate error is less than a first threshold value and/or direction angle error is less than a second threshold value as a ridge point matching pair; calculate a ratio of a number of real-time ridge points involved in the determined ridge point matching pair to a number of the plurality of real-time ridge points, as the result of the matching check, etc., but the example embodiments are not limited thereto.

Additionally, the check unit 120 may be further configured to determine a rotation and translation factor based on the real-time minutia and the historical minutia; and perform coordinate translation and/or direction angle rotation on the plurality of historical ridge points by using the rotation and translation factor, etc., but the example embodiments are not limited thereto.

Additionally, the real-time minutia surrounding feature includes a number of real-time ridges between the real-time minutia and each neighbor real-time minutia, and the historical minutia surrounding feature includes a number of historical ridges between the historical minutia and each neighbor historical minutia, the check unit 120 may be further configured to determine a matching relationship between a plurality of real-time minutiae and a plurality of historical minutiae according to the at least one minutia matching pair of the target fingerprint, determine, according to the matching relationship, a plurality of real-time minutia pairs and a plurality of corresponding historical minutia pairs, calculating a number of real-time ridges between each of the plurality of real-time minutia pairs and a number of historical ridges between each of the plurality of historical detail pairs, respectively, determining a ratio of a number of real-time minutia pairs whose a difference between a number of real-time ridges and a number of corresponding historical ridges is less than a third threshold to a number of the plurality of real-time minutia pairs, as the result of the matching check, etc., but the example embodiments are not limited thereto.

Additionally, the check unit 120 may be further configured to acquire real-time location information of a real-time minutia involved in each minutia matching pair, and acquiring historical location information of a historical minutia involved in each minutia matching pair from the data template according to the historical minutia; determine a first public area of each real-time minutia based on corresponding real-time location information, and determining a second public area of each historical minutia based on corresponding historical location information; detect a first number of real-time minutiae in each first public area, and detecting a second number of historical minutiae in each second public area; calculate, based on a matching relationship of the minutia matching pair, a ratio of a number of real-time minutiae whose a difference between the first number and the second number is less than a fourth threshold to a number of real-time minutiae in the at least one minutia matching pair, as the result of the matching check, etc., but the example embodiments are not limited thereto.

Additionally, the result determination unit 130 may be configured to adjust the preliminary matching score based on the result of the matching check; determine the final authentication result of the target fingerprint is that the authentication passes in the case where the adjusted preliminary matching score is greater than a desired and/or preset matching score threshold; determine the final authentication result of the target fingerprint is that the authentication fails in the case that the adjusted preliminary matching score is less than the desired and/or preset matching score threshold, but the example embodiments are not limited thereto.

It should be understood that each unit/module in the fingerprint authentication device according to at least one example embodiment of the inventive concepts may be implemented as a hardware component and/or a software component executed on a hardware component. A person skilled in the art can implement each of the defined units/modules by using a field programmable gate array (FPGA) and/or an application specific integrated circuit (ASIC) according to the processing performed by each of the units/modules, etc.

According to another aspect of at least one example embodiment of the inventive concepts, there is provided a computer-readable storage medium storing a computer program, wherein the computer program, when executed by at least one processor, implements the fingerprint authentication method of one or more of the example embodiments.

Specifically, the fingerprint authentication method for a host device according to at least one example embodiment of the inventive concepts may be written as a computer program, code segment, instruction or any combination thereof, and recorded, stored or fixed in one or more non-transitory computer-readable storage medium or on one or more non-transitory computer-readable storage medium. The computer-readable storage medium is any data storage device that can store data read by a computer system. Examples of the computer-readable storage medium include a read-only memory, a random access memory, read-only optical disks, magnetic tapes, floppy disks, optical data storage devices, etc.

According to another aspect of at least one example embodiment of the inventive concepts, there is provided an electronic device, wherein the electronic device includes: at least one processor; at least one memory storing computer-executable instructions, wherein the computer-executable instructions, when executed by the at least one processor, cause the at least one processor to perform the fingerprint authentication method described in at least one example embodiment of the inventive concepts.

Specifically, the electronic device may broadly be a tablet computer, a smart phone, a smart watch, or any other electronic device that has desired and/or necessary computing and/or processing capabilities. In at least one example embodiment, the electronic device may include at least one processor, a memory, a network interface, a communication interface, etc. connected through at least one system bus, etc. The processor of the electronic device may be used to provide desired and/or necessary calculation, processing, and/or control capabilities. The memory of the electronic device may include a non-volatile storage medium and internal memory. An operating system, computer program, etc. may be stored in or on the non-volatile storage medium. The internal memory may provide an environment for the operation of the operating system and the computer program in the non-volatile storage medium. The network interface and communication interface of the electronic device may be used to connect and communicate with external devices through network.

In summary, the fingerprint authentication method provided by one or more of the example embodiments of the inventive concepts may perform the matching check on the minutia matching pair involved in the preliminary authentication result by acquiring the minutia surrounding feature, and adaptively adjust the matching score based on the result of the check, thereby improving the accuracy of minutia matching, reducing the probability of mis-authentication of fingerprint authentication, and/or ensuring the security of user equipment information while improving user experience, etc.

In addition, the matching check algorithms proposed by one or more of the example embodiments of the inventive concepts are lightweight, which will not increase the complexity of the minutia fingerprint matching algorithm, and may be applied to lightweight embedded devices, such as smart cards, etc.

Although some example embodiments of the inventive concepts have been shown and described, those of ordinary skill in the art will understand that these example embodiments may be modified without departing from the principle and spirit of the inventive concepts whose scope is defined by claims and their equivalents.

What is claimed is:

1. A fingerprint authentication method, wherein the fingerprint authentication method comprises:
   acquiring target fingerprint data of a user using at least one fingerprint sensor;
   determining a preliminary authentication result of the target fingerprint data based on at least one historical fingerprint data stored in memory, the determining including analyzing a real-time minutia included in the target fingerprint data and a historical minutia included in the at least one historical fingerprint data;
   performing a matching check on the preliminary authentication result, the matching check including analyzing at least one surrounding feature associated with the real-time minutia and at least one surrounding feature associated with the historical minutia; and determining a final authentication result of the target fingerprint data based on results of the matching check.

2. The fingerprint authentication method of claim 1, wherein the determining the preliminary authentication result comprises:
- determining at least one minutia matching pair included in the target fingerprint data, the determining the at least one minutia matching pair including,
  - extracting the real-time minutia from the target fingerprint data, and
  - extracting the historical minutia from the at least one historical fingerprint data matching the real-time minutia; and
- determining a preliminary matching score corresponding to the at least one minutia matching pair.

3. The fingerprint authentication method of claim 2, wherein the performing the matching check on the preliminary authentication result further comprises:
- performing the matching check on the at least one minutia matching pair of the target fingerprint data based on a data template.

4. The fingerprint authentication method of claim 3, wherein
- the data template comprises historical minutiae, and a plurality of historical minutia surrounding features associated with the historical minutiae, the plurality of historical minutia surrounding features including the at least one surrounding feature associated with the historical minutia; and
- the performing the matching check on the at least one minutia matching pair of the target fingerprint data based on the data template comprises,
  - determining the at least one surrounding feature associated with the real-time minutia from the target fingerprint data; and
  - performing the matching check on the at least one minutia matching pair of the target fingerprint data based on the at least one surrounding feature associated with the real-time minutia of the target fingerprint data and the at least one surrounding feature associated with the historical minutia of the at least one historical fingerprint data.

5. The fingerprint authentication method of claim 4, wherein
- the at least one surrounding feature associated with the real-time minutia comprises a plurality of real-time ridge points of a ridge where the real-time minutia is located in the target fingerprint data;
- the at least one surrounding feature associated with the historical minutia comprises a plurality of historical ridge points of a ridge where the historical minutia is located in the at least one historical fingerprint data; and
- the performing the matching check on the at least one minutia matching pair of the target fingerprint data based on the at least one surrounding feature associated with the real-time minutia and the at least one surrounding feature associated with the historical minutia comprises:
  - determining at least one ridge point matching pair from the plurality of real-time ridge points and the plurality of historical ridge points by identifying a real-time ridge point and a historical ridge point pair whose coordinate error is less than a coordinate error threshold value and/or whose direction angle error is less than a direction angle error threshold value; and
  - determining the results of the matching check based on a ratio of a number of real-time ridge points involved in the determined ridge point matching pair to a number of the plurality of real-time ridge points.

6. The fingerprint authentication method of claim 5, wherein the determining the at least one ridge point matching pair comprises:
- determining a rotation and translation factor based on the real-time minutia and the historical minutia; and
- performing coordinate translation and/or direction angle rotation on the plurality of historical ridge points by using the rotation and translation factor.

7. The fingerprint authentication method of claim 4, wherein
- the at least one surrounding feature associated with the real-time minutia comprises a plurality of real-time ridges between the real-time minutia and each neighbor real-time minutia, and the at least one surrounding feature associated with the historical minutia comprises a plurality of historical ridges between the historical minutia and each neighbor historical minutia; and
- performing the matching check on the at least one minutia matching pair of the target fingerprint data based on the at least one surrounding feature associated with the real-time minutia and the at least one surrounding feature associated with the historical minutia comprises,
  - determining a matching relationship between a plurality of real-time minutiae and a plurality of historical minutiae based on the at least one minutia matching pair of the target fingerprint data,
  - determining, based on the matching relationship, a plurality of real-time minutia pairs and a plurality of corresponding historical minutia pairs,
  - calculating a number of real-time ridges between each of the plurality of real-time minutia pairs and a number of historical ridges between each of the plurality of historical minutia pairs, respectively,
  - determining a number of real-time minutia pairs whose difference between the number of the real-time ridges and the number of the historical ridges is less than a quantitative ratio threshold value, and
  - determining the results of the matching check based on a ratio between the determined number of real-time minutia pairs and a total number of real-time minutia pairs.

8. The fingerprint authentication method of claim 3, wherein the performing the matching check on the at least one minutia matching pair of the target fingerprint data based on the data template comprises:
- acquiring real-time location information corresponding to the real-time minutia included in each of the at least one minutia matching pair;
- acquiring historical location information corresponding to the historical minutia included in each of the at least one minutia matching pair from the data template;
- determining first public areas corresponding to each of the real-time minutia based on the corresponding real-time location information;
- determining second public areas corresponding to each of the historical minutia based on the corresponding historical location information;
- calculating a first number of real-time minutiae in each of the first public areas;

calculating a second number of historical minutiae in each of the second public areas;

calculating, based on a matching relationship of the minutia matching pair, a number of real-time minutiae whose difference between the first number and the second number is less than a difference threshold value; and determining the results of the matching check based on a ratio between the calculated number of real-time minutiae and a total number of real-time minutiae in the at least one minutia matching pair.

9. The fingerprint authentication method of claim 2, wherein the determining the final authentication result of the target fingerprint data based on the result of the matching check comprises:

adjusting the preliminary matching score based on the result of the matching check;

determining the target fingerprint data is authenticated in response to the adjusted preliminary matching score being greater than a desired matching score threshold; and determining the target fingerprint data fails authentication in response to the adjusted preliminary matching score is less than or equal to the desired matching score threshold.

10. A fingerprint authentication device, wherein the fingerprint authentication device comprises:

memory having computer readable instructions stored thereon; and processing circuitry configured to execute the computer readable instructions to, acquire target fingerprint data of a user using at least one fingerprint sensor, determine a preliminary authentication result of the target fingerprint data based on at least one historical fingerprint data stored in the memory, the determining including analyzing a real-time minutia included in the target fingerprint data and a historical minutia included in the at least one historical fingerprint data, perform a matching check on the preliminary authentication result, the matching check including analyzing at least one surrounding feature associated with the real-time minutia and at least one surrounding feature associated with the historical minutia, and determine a final authentication result of the target fingerprint data based on results of the matching check.

11. The fingerprint authentication device of claim 10, wherein the processing circuitry is further configured to:

determine at least one minutia matching pair included in the target fingerprint data, the determining the at least one minutia matching pair including, extracting a real-time minutia from the target fingerprint data, and extracting a historical minutia from the at least one historical fingerprint data matching the real-time minutia; and determining a preliminary matching score corresponding to the at least one minutia matching pair.

12. The fingerprint authentication device of claim 11, wherein the processing circuitry is further configured to:

perform the matching check on the at least one minutia matching pair of the target fingerprint data based on a data template.

13. The fingerprint authentication device of claim 12, wherein the data template comprises historical minutiae, and a plurality of historical minutia surrounding features associated with the historical minutiae, the plurality of historical minutia surrounding features including the at least one surrounding feature associated with the historical minutia; and the processing circuitry is further configured to, determine the at least one surrounding feature associated with the real-time minutia from the target fingerprint data; and perform the matching check on the at least one minutia matching pair of the target fingerprint data based on the at least one surrounding feature associated with the real-time minutia of the target fingerprint data and the at least one surrounding feature associated with the historical minutia of the at least one historical fingerprint data.

14. The fingerprint authentication device of claim 13, wherein the at least one surrounding feature associated with the real-time minutia comprises a plurality of real-time ridge points of a ridge where the real-time minutia is located in the target fingerprint data;

the at least one surrounding feature associated with the historical minutia comprises a plurality of historical ridge points of a ridge where the historical minutia is located in the at least one historical fingerprint data; and the processing circuitry is further configured to:

determine at least one ridge point matching pair from the plurality of real-time ridge points and the plurality of historical ridge points by identifying a real-time ridge point and a historical ridge point pair whose coordinate error is less than a coordinate error threshold value and/or whose direction angle error is less than a direction angle error threshold value; and determine the results of the matching check based on a ratio of a number of real-time ridge points involved in the determined ridge point matching pair to a number of the plurality of real-time ridge points.

15. The fingerprint authentication device of claim 14, wherein the processing circuitry is further configured to:

determine a rotation and translation factor based on the real-time minutia and the historical minutia; and perform coordinate translation and/or direction angle rotation on the plurality of historical ridge points by using the rotation and translation factor.

16. The fingerprint authentication device of claim 13, wherein the at least one surrounding feature associated with the real-time minutia comprises a plurality of real-time ridges between the real-time minutia and each neighbor real-time minutia, and the at least one surrounding feature associated with the historical minutia comprises a plurality of historical ridges between the historical minutia and each neighbor historical minutia; and the processing circuitry is further configured to, determine a matching relationship between a plurality of real-time minutiae and a plurality of historical minutiae based on the at least one minutia matching pair, determine, based on the matching relationship, a plurality of real-time minutia pairs and a plurality of corresponding historical minutia pairs, calculate a number of real-time ridges between each of the plurality of real-time minutia pairs and a number of historical ridges between each of the plurality of historical minutia pairs, respectively, determine a number of real-time minutia pairs whose difference between the number of the real-time ridges and the number of the historical ridges is less than a quantitative ratio threshold value, and determine the results of the matching check based on a ratio between the determined number of real-time minutia pairs and a total number of real-time minutia pairs.

17. The fingerprint authentication device of claim 12, wherein the processing circuitry is further configured to:

acquire real-time location information corresponding to the real-time minutia included in each of the at least one minutia matching pair;

acquire historical location information corresponding to the historical minutia included in each of the at least one minutia matching pair from the data template;

determine first public areas corresponding to each of the real-time minutia based on the corresponding real-time location information;

determine second public areas corresponding to each of the historical minutia based on the corresponding historical location information;

calculate a first number of real-time minutiae in each of the first public areas;

calculate a second number of historical minutiae in each of the second public areas;

calculate, based on a matching relationship of the minutia matching pair, a number of real-time minutiae whose difference between the first number and the second number is less than a difference threshold value; and determine the results of the matching check based on a ratio between the calculated number of real-time minutiae and a total number of real-time minutiae in the at least one minutia matching pair.

18. The fingerprint authentication device of claim 11, wherein the processing circuitry is configured to:

adjust the preliminary matching score based on the result of the matching check;

determine the target fingerprint data is authenticated in response to the adjusted preliminary matching score being greater than a desired matching score threshold; and determine the target fingerprint data fails authentication in response to the adjusted preliminary matching score being less than or equal to the desired matching score threshold.

19. A non-transitory computer-readable storage medium storing computer readable instructions, which when executed by at least one processor, causes the at least one processor to perform fingerprint authentication method, wherein the fingerprint authentication method comprises:

acquiring target fingerprint data of a user using at least one fingerprint sensor;

determining a preliminary authentication result of the target fingerprint data based on at least one historical fingerprint data stored in memory, the determining including analyzing a real-time minutia included in the target fingerprint data and a historical minutia included in the at least one historical fingerprint data;

performing a matching check on the preliminary authentication result, the matching check including analyzing at least one surrounding feature associated with the real-time minutia and at least one surrounding feature associated with the historical minutia; and determining a final authentication result of the target fingerprint data based on results of the matching check.

20. The non-transitory computer-readable storage medium of claim 19, wherein the determining the preliminary authentication result comprises:

determining at least one minutia matching pair included in the target fingerprint data, the determining the at least one minutia matching pair including, extracting the real-time minutia from the target fingerprint data, and extracting the historical minutia from the at least one historical fingerprint data matching the real-time minutia; and determining a preliminary matching score corresponding to the at least one minutia matching pair.

* * * * *